US012478871B2

(12) United States Patent
Cerny et al.

(10) Patent No.: US 12,478,871 B2
(45) Date of Patent: Nov. 25, 2025

(54) GAME PLAY REWIND WITH USER TRIGGERED BOOKMARKS

(71) Applicant: Sony Interactive Entertainment Inc., Tokyo (JP)

(72) Inventors: Mark E. Cerny, Los Angeles, CA (US); Dustin S. Clingman, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 339 days.

(21) Appl. No.: 18/309,688

(22) Filed: Apr. 28, 2023

(65) Prior Publication Data

US 2024/0359093 A1 Oct. 31, 2024

(51) Int. Cl.

| | |
|---|---|
| ***A63F 13/497*** | (2014.01) |
| ***A63F 13/49*** | (2014.01) |
| ***A63F 13/493*** | (2014.01) |
| ***A63F 13/533*** | (2014.01) |
| ***A63F 13/60*** | (2014.01) |
| *A63F 13/35* | (2014.01) |
| *A63F 13/355* | (2014.01) |
| *A63F 13/86* | (2014.01) |

(52) U.S. Cl.

CPC ............ *A63F 13/497* (2014.09); *A63F 13/49* (2014.09); *A63F 13/493* (2014.09); *A63F 13/533* (2014.09); *A63F 13/60* (2014.09); *A63F 13/35* (2014.09); *A63F 13/355* (2014.09); *A63F 13/86* (2014.09); *A63F 2300/554* (2013.01); *A63F 2300/634* (2013.01); *A63F 2300/636* (2013.01)

(58) Field of Classification Search

CPC ...... A63F 13/497; A63F 13/49; A63F 13/493; A63F 13/533; A63F 13/60; A63F 13/35; A63F 13/355; A63F 13/86; A63F 2300/554; A63F 2300/634; A63F 2300/636

See application file for complete search history.

(56) References Cited

U.S. PATENT DOCUMENTS

| | | | | |
|---|---|---|---|---|
| 8,495,678 B2 * | 7/2013 | Perlman | .................. | H04L 65/80 725/116 |
| 8,661,496 B2 * | 2/2014 | Perlman | .................. | H04L 65/65 463/40 |
| 9,084,936 B2 * | 7/2015 | Perlman | ................. | H04N 19/61 |

(Continued)

*Primary Examiner* — William H Mcculloch, Jr.

(74) *Attorney, Agent, or Firm* — Kilpatrick Townsend & Stockton LLP

(57) ABSTRACT

A method including receiving actuation of a universal button on a controller during live game play of a video game, wherein image frames of the live game play are displayed in sequential order, wherein a current image frame is being displayed when the universal button is actuated. The method including receiving selection of a rewind mode from features presented in a user interface displayed simultaneous with the live game play in response to the actuation of the universal button. The method including accessing from storage a subset of captured image frames generated for the game play. The method including entering the rewind mode by automatically switching from displaying the live game play to displaying the subset of captured image frames in reverse beginning from the current image frame. The method including responding to rewind controller inputs for controlling the displaying of the subset of captured image frames in rewind mode.

20 Claims, 8 Drawing Sheets

(56) References Cited

U.S. PATENT DOCUMENTS

| | | | | |
|---|---|---|---|---|
| 9,770,657 | B2 * | 9/2017 | Perlman | A63F 13/355 |
| 12,284,421 | B2 * | 4/2025 | Clingman | H04N 21/47217 |
| 2009/0118017 | A1 * | 5/2009 | Perlman | A63F 13/335 463/42 |
| 2009/0119730 | A1 * | 5/2009 | Perlman | H04N 21/6125 725/114 |
| 2018/0021684 | A1 * | 1/2018 | Benedetto | A63F 13/86 463/24 |
| 2020/0410241 | A1 * | 12/2020 | Sundareson | A63F 13/86 |
| 2024/0359093 | A1 * | 10/2024 | Cerny | A63F 13/355 |
| 2024/0388766 | A1 * | 11/2024 | Clingman | G06V 10/764 |

* cited by examiner

GAME PLAY REWIND WITH USER TRIGGERED BOOKMARKS

TECHNICAL FIELD

The present disclosure is related to gaming, and more specifically to a system implemented rewind mode of live game play accessible via a universal button enabling replaying captured image frames of the game play.

BACKGROUND OF THE DISCLOSURE

Video games and/or gaming applications and their related industries (e.g. video gaming) are extremely popular and represent a large percentage of the worldwide entertainment market. Video games are played anywhere and at any time using various types of platforms, including gaming consoles, desktop or laptop computers, mobile phones, etc.

During live game play of a video game, a player may wish to review recently played portions the game play. For example, the player may have been given some important information to perform a quest, such as when a non-player character (NPC) provides details on capturing an object (e.g. weapon) with additional instructions to bring that object to a particular location. At some point during the live game play, the player may have forgotten portions of or all of the information, and may wish to revisit their recent game play. This may occur when the player decides to perform the quest later, and has forgotten certain details of the quest when the player ultimately tries to complete the quest. Also, the player may be in the middle of performing the quest, but may have forgotten what the next step in the quest is, or may not know how to complete a current step in the quest. For instance, a player may forget how to reach or return to a particular location, such as when the player is told to return to the original location where the NPC provided the quest to prove that the quest has been completed).

Accessing recent game play while the player is playing a video game is difficult, and requires hacking an existing service to view the portion of the game play of interest. For instance, the player may have to specifically instruct the gaming system to create a file including portions of game play for purposes of sharing with other players. The player may have to exit the game play in order to create the sharing file. When the sharing file is completed, the player can then access the portion of the game play of interest for viewing.

It is in this context that embodiments of the disclosure arise.

SUMMARY

Embodiments of the present disclosure relate to system implemented rewind mode of live game play accessible via a universal button on a game controller during live game play that is configured for accessing a user interface enabling rewinding and forwarding through captured image frames of the game play.

In one embodiment, a method is disclosed. The method including receiving actuation of a universal button on a controller during live game play of a video game being played by a user, wherein a plurality of image frames of the live game play that is generated through execution of the video game in response to game controller input by the user is presented in sequential order on a display of the user, wherein a current image frame is being displayed when the universal button is actuated. The method including receiving selection of a rewind mode from a plurality of features presented in a user interface displayed simultaneous with one or more corresponding image frames of the live game play in response to the actuation of the universal button. The method including accessing from storage a subset of captured image frames of the plurality of image frames generated for the game play of the video game. The method including entering the rewind mode by automatically switching from displaying the live game play of the video game to displaying the subset of captured image frames in reverse beginning from the current image frame. The method including responding to one or more rewind controller inputs by the user configured for controlling the displaying of the subset of captured image frames in the rewind mode.

In another embodiment, a non-transitory computer-readable medium storing a computer program for implementing a method is disclosed. The computer-readable medium including program instructions for receiving actuation of a universal button on a controller during live game play of a video game being played by a user, wherein a plurality of image frames of the live game play that is generated through execution of the video game in response to game controller input by the user is presented in sequential order on a display of the user, wherein a current image frame is being displayed when the universal button is actuated. The computer-readable medium including program instructions for receiving selection of a rewind mode from a plurality of features presented in a user interface displayed simultaneous with one or more corresponding image frames of the live game play in response to the actuation of the universal button. The computer-readable medium including program instructions for accessing from storage a subset of captured image frames of the plurality of image frames generated for the game play of the video game. The computer-readable medium including program instructions for entering the rewind mode by automatically switching from displaying the live game play of the video game to displaying the subset of captured image frames in reverse beginning from the current image frame. The computer-readable medium including program instructions for responding to one or more rewind controller inputs by the user configured for controlling the displaying of the subset of captured image frames in the rewind mode.

In still another embodiment, a computer system is disclosed, wherein the computer system includes a processor and memory coupled to the processor and having stored therein instructions that, if executed by the computer system, cause the computer system to execute a method. The method including receiving actuation of a universal button on a controller during live game play of a video game being played by a user, wherein a plurality of image frames of the live game play that is generated through execution of the video game in response to game controller input by the user is presented in sequential order on a display of the user, wherein a current image frame is being displayed when the universal button is actuated. The method including receiving selection of a rewind mode from a plurality of features presented in a user interface displayed simultaneous with one or more corresponding image frames of the live game play in response to the actuation of the universal button. The method including accessing from storage a subset of captured image frames of the plurality of image frames generated for the game play of the video game. The method including entering the rewind mode by automatically switching from displaying the live game play of the video game to displaying the subset of captured image frames in reverse beginning from the current image frame. The method including responding to one or more rewind controller inputs by the user configured for controlling the displaying of the subset of captured image frames in the rewind mode.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which.

DETAILED DESCRIPTION

Figure 1:
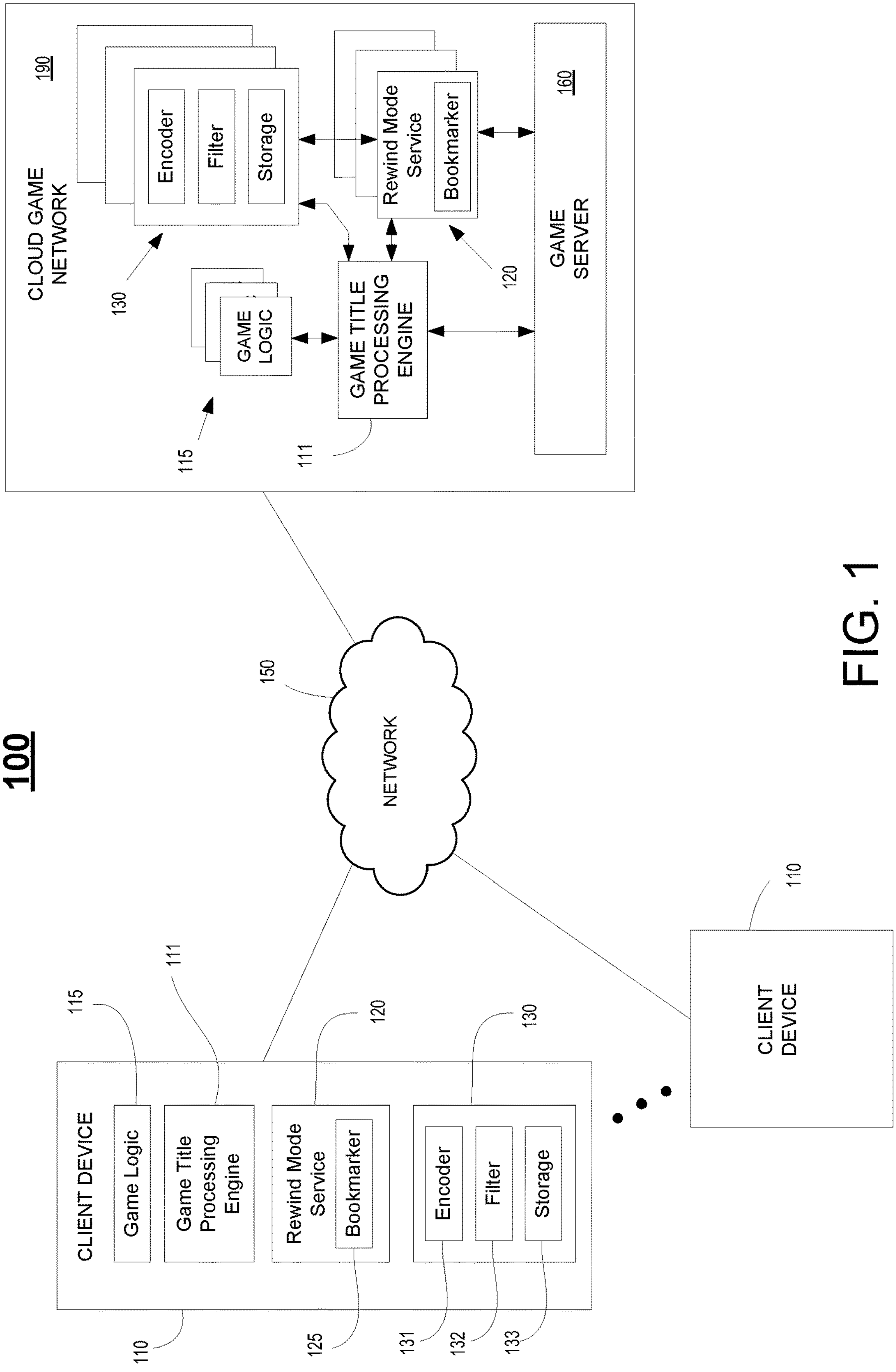
FIG. 1 illustrates a system including a rewind mode service implemented during live game play that is configured to replay captured image frames of recent game play, in accordance with one embodiment of the present disclosure.

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure describe systems and methods implementing a system implemented rewind mode of live game play accessible via a universal button on a game controller during live game play that is configured for accessing a user interface enabling rewinding and forwarding through captured image frames of the game play. In that manner, the user is able to enter the rewind mode from the live game play using one or more controller inputs to view recent game play (e.g. rewinding, fast-forwarding, playing, etc.), and returning to live game play afterwards. Automatic bookmarking of captured image frames or events that are triggered through user interaction (e.g. user visiting an image frame or event during the rewind mode, etc.) enable the user to automatically jump to the bookmarked image frame or event in a subsequent access of the rewind mode. In addition, because image frames and/or events are automatically bookmarked, the user is able to select a particular bookmarked image frame and/or event from a list of bookmarks when entering the rewind mode.

Advantages of the methods and systems configured to implement a system implemented rewind mode to revisit recent game play that is accessible via a universal button on a game controller during live game play include a seamless experience in replaying the recent game play. That is, a user is able to enter the rewind mode from live game play without accessing a stored file, e.g. if storage of captured image frames is implemented as a buffer in system memory in one embodiment. Controller input enables intuitive control of the rewind mode, including pre-assigned buttons for rewinding, fast-rewinding, forwarding, fast-forwarding, pausing, playing, and returning back to live game play. Control of rewind mode may also be implemented through interaction with icons via a user interface. Entering rewind mode can be implemented via actuation of as little as one or two controller inputs. When entering the rewind mode for the first time, captured image frames are automatically replayed in reverse mode from a current image frame of the live game play without additional user input from the user. Auto-bookmarking of one or more captured image frames that are of interest to the user, and/or auto-bookmarking of events occurring during the game play enables the user to flip back-and-forth between live game play and a bookmarked series of captured image frames or event. For example, while playing a quest of a video game, the user may periodically flip back to a bookmark to replay captured image frames that provide details of the quest (e.g. where to go, what to obtain, etc.) in case the user needs to know what next to do in the quest.

Throughout the specification, the reference to "game" or video game" or "gaming application" is meant to represent any type of interactive application that is directed through execution of input commands. For illustration purposes only, an interactive application includes applications for gaming, word processing, video processing, video game processing, etc. Also, the terms "virtual world" or "virtual environment" or "metaverse" is meant to represent any type of environment generated by a corresponding application or applications for interaction between a plurality of users in a multi-player session or multi-player gaming session. Further, the terms introduced above are interchangeable.

With the above general understanding of the various embodiments, example details of the embodiments will now be described with reference to the various drawings.

FIG. 1 illustrates a system 100 including a rewind mode service 120 configured to enable replaying of recent game play through a system implemented rewind mode of live game play. The rewind mode is accessible via a universal button to enable replaying of captured image frames of the game play. The universal button may be a system button that generally is not being used to control the game being played, and for example may be used to access one or more features supplementing the game play. In that manner, the user is able to enter the rewind mode from the live game play using one or more controller inputs to view recent game play (e.g. rewinding, fast-forwarding, playing, etc.), and return to live game play afterwards. The rewind mode may be useful to a user wishing to quickly review recent game play to recapture understanding of what recently transpired (e.g. issuing of a quest, etc.), or simply to view recent game play for pleasure.

As shown, system 100 may provide gaming over a network 150 for and between one or more client devices 110. In particular, system 100 may be configured to provide gaming to users participating in a single-player or multi-player gaming session (e.g. participating in a video game in single-player mode, participating in a video game in multi-player mode, participating in a metaverse generated by an application with other players, etc.) via a cloud game network 190, wherein the game can be executed locally (e.g. on a local client device of a corresponding user) or can be executed remotely from a corresponding client device 110 (e.g. acting as a thin client) of a corresponding user that is playing the video game, in accordance with one embodiment of the present disclosure. In at least one capacity, the cloud game network 190 supports a multi-player gaming session for a group of users, to include delivering and receiving game data of players for purposes of coordinating and/or aligning objects and actions of players within a scene of a gaming world or metaverse, managing communications between user, etc. so that the users in distributed locations participating in a multi-player gaming session can interact with each other in the gaming world or metaverse in real-time.

In particular, system 100 may provide gaming control to one or more users playing one or more applications (e.g. video games) either through local instances operating on client devices or through cloud based instances operating in the cloud game network 190 via network 150 in the multi-player session. Network 150 may include one or more communication technologies, including 5th Generation (5G) network technology having advanced wireless communication systems (e.g. cellular network technology). In some embodiments, the cloud game network 190 may include a plurality of virtual machines (VMs) running on a hypervisor of a host machine, with one or more virtual machines configured to execute a game processor module utilizing the hardware resources available to the hypervisor of the host. It should be noted, that access services, such as providing access to games of the current embodiments, delivered over a wide geographical area often use cloud computing. Cloud computing is a style of computing in which dynamically scalable and often virtualized resources are provided as a service over the internet.

In a multi-player session allowing participation for a group of users to interact within a gaming world or metaverse generated by an application (which may be a video game), some users may be executing an instance of the application locally on a client device to participate in the multi-player session. Other users who do not have the application installed on a selected device or when the selected device is not computationally powerful enough to executing the application may be participating in the multi-player session via a cloud based instance of the application executing at the cloud game network 190.

As shown, the cloud game network 190 includes a game server 160 that provides access to a plurality of video games. Most applications played in a corresponding multi-player session are played over the network 150 with connection to the game server 160. For example, in a multi-player session involving multiple instances of an application (e.g. generating virtual environment, gaming world, metaverse, etc.), a dedicated server application (session manager) collects data from users and distributes it to other users so that all instances are updated as to objects, characters, etc. to allow for real-time interaction within the virtual environment of the multi-player session, wherein the users may be executing local instances or cloud based instances of the corresponding application. Game server 160 may be any type of server computing device available in the cloud, and may be configured as one or more virtual machines executing on one or more hosts. For example, game server 160 may manage a virtual machine supporting a game processor that instantiates a cloud based instance of an application for a user. As such, a plurality of game processors of game server 160 associated with a plurality of virtual machines is configured to execute multiple instances of one or more applications associated with gameplays of a plurality of users. In that manner, back-end server support provides streaming of media (e.g. video, audio, etc.) of gameplays of a plurality of applications (e.g. video games, gaming applications, etc.) to a plurality of corresponding users. That is, game server 160 is configured to stream data (e.g. rendered images and/or frames of a corresponding gameplay) back to a corresponding client device 110 through network 150. In that manner, a computationally complex gaming application may be executing at the back-end server in response to controller inputs received and forwarded by client device 110. Each server is able to render images and/or frames that are then encoded (e.g. compressed) and streamed to the corresponding client device for display. Game server 160 is also configured to stream video in support of the rewind mode to enable replaying of recent game play.

In the multi-player session, instances of an application may be executing locally on a client device 110 or at the cloud game network 190. In either case, the application as game logic 115 is executed by a game engine 111 (e.g. game title processing engine). For purposes of clarity and brevity, the implementation of game logic 115 and game engine 111 is described within the context of the cloud game network 190. In particular, the application may be executed by a distributed game title processing engine (referenced herein as "game engine"). In particular, game server 160 and/or the game title processing engine 111 includes basic processor based functions for executing the application and services associated with the application. For example, processor based functions include 2D or 3D rendering, physics, physics simulation, scripting, audio, animation, graphics processing, lighting, shading, rasterization, ray tracing, shadowing, culling, transformation, artificial intelligence, etc. In that manner, the game engines implement game logic, perform game calculations, physics, geometry transformations, rendering, lighting, shading, audio, as well as additional in-game or game-related services. In addition, services for the application include memory management, multi-thread management, quality of service (QOS), bandwidth testing, social networking, management of social friends, communication with social networks of friends, social utilities, communication channels, audio communication, texting, messaging, instant messaging, chat support, game play replay functions, help functions, etc.

Users access the remote services with client devices 110, which include at least a CPU, a display and input/output (I/O). For example, users may access cloud game network 190 via communications network 150 using corresponding client devices 110 configured for updating a session controller (e.g. delivering and/or receiving user game state data), receiving streaming media, etc. The client device 110 can be a personal computer (PC), a mobile phone, a netbook, a personal digital assistant (PAD), handheld device, etc.

In one embodiment, client device 110 may be configured with a game title processing engine and game logic for at least some local processing of an application, and may be further utilized for receiving streaming content as generated by the application executing at a back-end server, or for other content provided by back-end server support. In still other embodiments, for independent local processing the game title processing engine 111 includes basic processor based functions for executing an application and services associated with the application, as previously described. For local processing, the game logic 115 is stored on the local client device 110 and is used for executing the application. For example, an instance of an application is executing by the game title processing engine 111 of a corresponding client device 110. Game logic 115 (e.g. executable code) implementing the application is stored on the corresponding client device 110, and is used to execute the application. For purposes of illustration, game logic 115 may be delivered to the corresponding client device 110 through a portable medium (e.g. optical media) or through a network (e.g. downloaded through the internet from a gaming provider).

In one embodiment, client device 110 may be configured as a thin client providing interfacing with a back end server (e.g. game server 160 of cloud game network 190) configured for providing computational functionality (e.g. including game title processing engine 111). In particular, client device 110 of a corresponding user (not shown) is configured for requesting access to applications over a communications network 150, such as the internet, and for rendering for display images generated by a video game executed by the game server 160, wherein encoded images are delivered (i.e., streamed) to the client device 110 for display in association with the corresponding user. For example, the user may be interacting through client device 110 with an instance of an application executing on a game processor of game server 160 in association with gameplay of a corresponding user, such as through input commands that are used to drive the gameplay. Client device 110 may receive input from various types of input devices, such as game controllers, tablet computers, keyboards, gestures captured by video cameras, mice, touch pads, audio input, etc. More particularly, an instance of the application is executed by the game title processing engine 111 and is configured for generating rendered images, which is delivered over network 150 for display at a corresponding display in association with client device 110. That is, client device 110 is configured for receiving encoded images (e.g. encoded from game rendered images generated through execution of a video game), and for displaying the images that are rendered for display. Game title processing engine 111 is able to support a plurality of applications using a plurality of game logics, each of which is selectable by the user.

In addition, system 100 includes a rewind mode service 120 configured to enable replaying of recent game play through a system implemented rewind mode of live game play. The rewind mode is accessible via a universal button to enable replaying of captured image frames of the game play. The rewind mode service 120 can be implemented at the back-end, such as via the cloud game network 190. For instance, when the video game is executed at the back-end cloud game network 190, the rewind mode service 120 in cooperation with the game server 160, that is communicating with a corresponding client device 110 of a user, can provide replaying of recent game play that is stored in temporary game play storage 130 located at the cloud game network 190. In another implementation, the rewind mode service 120 can be implemented locally at the client device 110 of a user. For example, when the video game is executing locally, the rewind mode service 120 can provide replaying of recent game play that is stored in storage 133 that is local using the temporary game play storage service 130, such as being located at the client device 110.

The rewind mode services 120 at the back-end, cloud game network 190 or at the local, client device 110 are similarly configured. In particular, when a video game is executing, image frames and other data that are generated for a corresponding game play may be stored using temporary game play storage service 130. For example, when the video game is executing at the back-end cloud game network 190, the temporary game play storage service 130 may be similarly located at the back-end cloud game network and be configured for storing recent game play. On the other hand, when the video game is executing locally at the client device 110, the temporary game play storage service 130 may be local, such as being located at or in close proximity to the client device 110, and be configured for storing recent game play.

Storing of recent game play may be implemented in various manners. In embodiments, and for purposes of illustration, the temporary game play storage service 130 may communicate with a corresponding game title processing engine 111 (i.e., at client device 110 or at the cloud game network 190) and receive image frames of the corresponding game play as they are being generated. One or more captured image frames are encoded and/or compressed by encoder 131, and stored in a storage 133, such that each of the generated image frames may be stored or selected image frames that are generated may be stored. In one embodiment, storage 133 is a ring buffer operating as storage of fixed size, such that new data may overwrite old data. That is, the ring buffer cats its tail as new data is being stored.

The amount of game play that is stored in temporary game play storage may vary depending on design, and may consider the use of memory, how much memory is available for storing game play, and storage techniques. For example, in various embodiments, recent game play may be stored in increments of up to 30 minutes, or up to 60 minutes, or up to 120 minutes, or up to 240 minutes, or up to 24 hours, or up to 48 hours, etc.

In one embodiment, the temporary game play storage service 130 includes a filter 132 configured to filter out and/or remove one or more image frames of the recent game play of a user from being stored in storage 133. For example, when the user pauses active involvement in a gaming session (i.e., single-player or multi-player session), a character of the user may be shown in a semi-static position, such as standing in one location and slowly breathing. As long as no input is provided to change the movement and/or orientation of the character, it will seem as if the character is just standing. No progress in the game play may occur, especially in a single-player gaming session. In that case, filter 132 may determine when one or more image frames in the game play of a user illustrate inactivity by the corresponding user, and prevent those identified image frames from being stored in storage 133. The filter 132 may use other criteria for identifying image frames of little to no importance for purposes of not being stored in storage 133. By removing image frames that may not include important data, this may increase the total time of recent game play that is stored at a certain point in time.

Additionally, the rewind mode service 120 may include a bookmarker 125 that is configured to automatically bookmark one or more captured image frames that are of interest to the user. For instance, when a user is utilizing the rewind mode service to review recent game play, one or more captured image frames may be identified as being of interest (e.g. important) to the user, such as when the user pauses on one captured image frame, or stops and plays captured image frames from a starting captured image frame, or repeatedly goes forwards and backwards through a series of captured image frames (wherein one captured image frame associated with the series may be bookmarked). In addition, the bookmarker 125 may be configured to analyze telemetry data collected from the image frames of the game play in order to identify one or more events that are of importance and/or of interest to the user. In some implementations, the telemetry data is analyzed by a third party service to identify the events of importance and/or interest to the user. Once the event in the game play is identified, the bookmarker 125 is able to automatically bookmark one or more captured image frames within the event. In that manner, by bookmarking image frames within the recent game play, the user is able to readily review any game play that is associated with a bookmark through selection of that bookmark.

Figure 2:
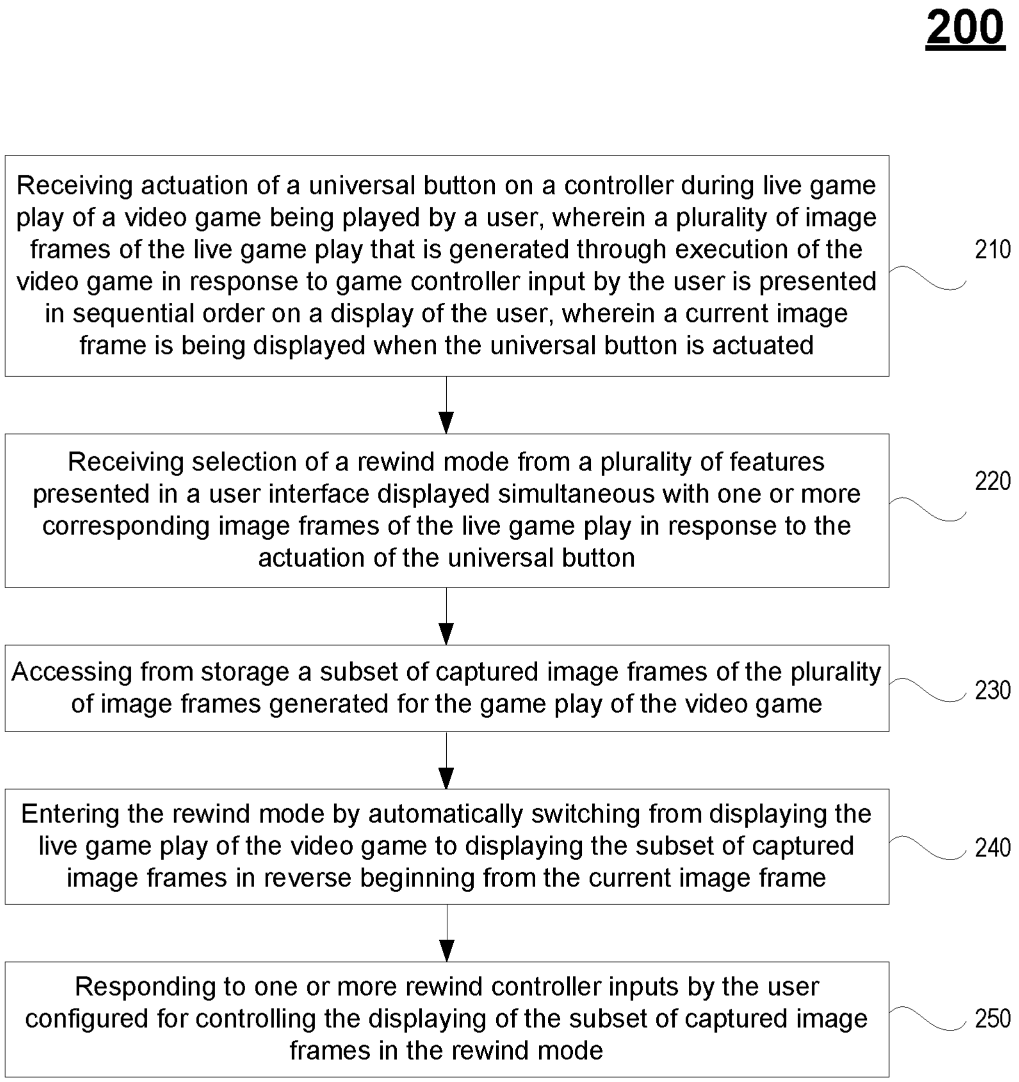
FIG. 2 is a flow diagram illustrating a method for enabling a rewind mode service during live game play in order to replay captured image frames of recent game play, in accordance with one embodiment of the present disclosure.

With the detailed description of the system 100 of FIG. 1, flow diagram 200 of FIG. 2 discloses a method for enabling a rewind mode service (also referred to as "rewind mode") during live game play in order to replay image frames of recent game play that are stored in a buffer, in accordance with one embodiment of the present disclosure. The operations performed in the flow diagram may be implemented by one or more of the entities previously described components, and also system 100 described in FIG. 1, including rewind mode service 120. In particular, FIG. 2 is a flow diagram illustrating a method for enabling a rewind mode of live game play that is accessible via a universal button on a game controller, wherein the rewind mode enables rewinding and forwarding through captured image frames of recent game play.

At 210, the method includes receiving actuation of a universal button on a controller during live game play of a video game being played by a user. During the live game play, a plurality of image frames of the live game play is generated through execution of the video game in response to game controller input by the user, such as that provided through interaction with a game controller. The image frames are presented in sequential order on a display of the user for the live game play. In addition, image frames that are generated for the live game play are temporarily placed in storage as captured image frames. For example, the captured image frames may be stored with or without compression (e.g. encoding).

As such, while a current frame is being displayed, the user actuates the universal button in order to initiate the rewind mode. In one embodiment, the universal button may be a system button that generally is not used to control the game being played. For example, the universal button may provide access to multiple features through a single action—i.e., actuation of the universal button. Once actuated, a user interface (e.g. showing a menu) may be displayed as an overlay to the image frames of the game play. The user interface may list the various features available, one of which is a rewind mode feature. Other features may include a sharing service, wherein a portion of the game play is identified and packaged in a file for sharing with other players or users. Another feature may include a highlight service, wherein one or more portions of the game play are packaged as a highlight reel that shows highlights of recent game play.

At 220, the method includes receiving selection of a rewind mode from a plurality of features presented in the user interface. The user interface may be displayed simultaneous with one or more corresponding image frames of the live game play, and may be presented in response to the actuation of the universal button.

At 230, the method includes accessing from the storage a subset of captured image frames (e.g. one or more captured image frames) of the plurality of image frames generated for the game play of the video game. In particular, selection of the rewind mode feature from the user interface enables access to recent game play of the user, and without accessing a file that needs to be created, found through a directory, and/or opened (e.g. storage may be implemented as a buffer in system memory). As previously described, image frames of the live game play are stored in a buffer after being generated. That is, each image frame is presented for display and one or more of the image frames being generated may also be placed in storage as captured image frames. In one implementation, each captured image frame is encoded and/or compressed, and automatically stored in such a way that they can be accessed in sequential order (e.g. stored with a timestamp indicating when the image frame was generated, etc.). For the replay mode, encoded captured image frames are decoded before presented for display. In another implementation, each captured image frame is stored in the buffer without encoding.

In one embodiment, the storage is a ring buffer, where as new captured image frames are stored, old captured image frames may be deleted. Generally, in the ring buffer new data may overwrite old data, especially when the ring buffer is full.

At 240, the method includes entering the rewind mode by automatically switching from displaying the live game play of the video game to displaying the recent game play as accessed from storage (e.g. decoded if the image frames have been encoded). For example, captured image frames from the subset of captured image frames are displayed in reverse beginning from the most current captured image frame. That is, the recent game play may be displayed in full screen (i.e., switching from live game play), or may be displayed in a smaller window overlaid the live game play. More particularly, in one implementation, when the rewind mode feature is actuated for a first time (e.g. within a time period), the recent game play is automatically displayed in reverse beginning from the current image frame being displayed, as will be further described below in relation to FIG. 3A. The speed of the captured image frames being displayed may start at a predesigned speed, with customization by the user to increase or decrease speeds, or play at normal speed, or pause on an image frame, or initiate forwarding, or fast-forwarding, or reversing, or fast-reversing, etc. In another implementation, when the rewind mode feature is actuated for a second time or a subsequent time (e.g. third, fourth, etc.), the user may be prompted to select a bookmarked image frame from a menu that is displayed to begin playing the recent game play, as will be further described below in relation to FIG. 3B. That is, the recent game play is played in forward beginning from the captured image frame that is bookmarked, and at 1× speed (e.g. normal speed). In another implementation, the recent game play is played in fast-forward beginning from the captured image frame that is bookmarked, at another predetermined speed (e.g. 2×, 3×, etc.), whereupon the user may select a play control button or icon to play the recent game play at normal speed, or any other control.

In one embodiment, instead of actuation of a universal button, the rewind mode feature is accessed using a dedicated button. In that case, the rewind mode is automatically enabled with the actuation of the dedicated button. For example, when the dedicated button is actuated for a first time (e.g. within a time period), the recent game play is automatically displayed in reverse beginning from the current image frame being displayed, as described above. Also, when the dedicated button is actuated for a second or subsequent time, the user may be prompted to select a bookmarked image frame from a menu being displayed to begin playing the recent game play in forward beginning from the image frame that is bookmarked, as described above. In still another embodiment, the rewind mode for a first or subsequent time may be initiated through voice activation.

At 250, the method includes responding to one or more rewind controller inputs by the user, wherein the controller inputs are configured for controlling the displaying of the subset of captured image frames in the rewind mode. The rewind controller inputs generally may include the following: rewinding at one or more speeds (e.g. 1×, 2×, etc.); or pause or stop; or forwarding at one or more speeds (e.g. 1×, 2×, etc.); or play; or skip a predetermined number of captured image frames; or skip a time interval in the game play to a new captured image frame; or return to live game play; etc.

The rewind controller inputs may be implemented through one or more controller buttons of a game controller, wherein each button on the controller may enable a particular feature in the rewind mode service (e.g. forwarding at one or more speeds, reversing at one or more speeds, pause, play, return to live game play, etc.). In another embodiment, the rewind controller inputs may be implemented through selection of one or more controller icons displayed in a user interface that is displayed as an overlay. In still another embodiment, the rewind controller inputs may be implemented through voice commands.

In one embodiment, a rewind controller input is received from the user, and is configured to return the user to live game play. As such, the rewind mode is terminated and/or exited by switching from displaying the recent captured game play to displaying image frames from the live game play. In one embodiment, the live game play is paused when enabling the rewind mode service, such as in some single-player gaming sessions. Generally, multi-player gaming sessions continue without any ability to pause. In that paused case, the live game play is displayed beginning again from the current image frame (i.e., the image frame from which the rewind mode service was enabled by actuating the universal button) as the live game play has been paused when enabling the rewind mode service. In another embodiment, the live game play continues when enabling the rewind mode service, such as during multi-player gaming sessions as described above, and in some single-player gaming sessions that do not allow for pausing. In that non-paused case, the live game play is displayed beginning with an updated current image frame because the live game play continued playing when the user enabled the rewind mode service.

Figure 3A:
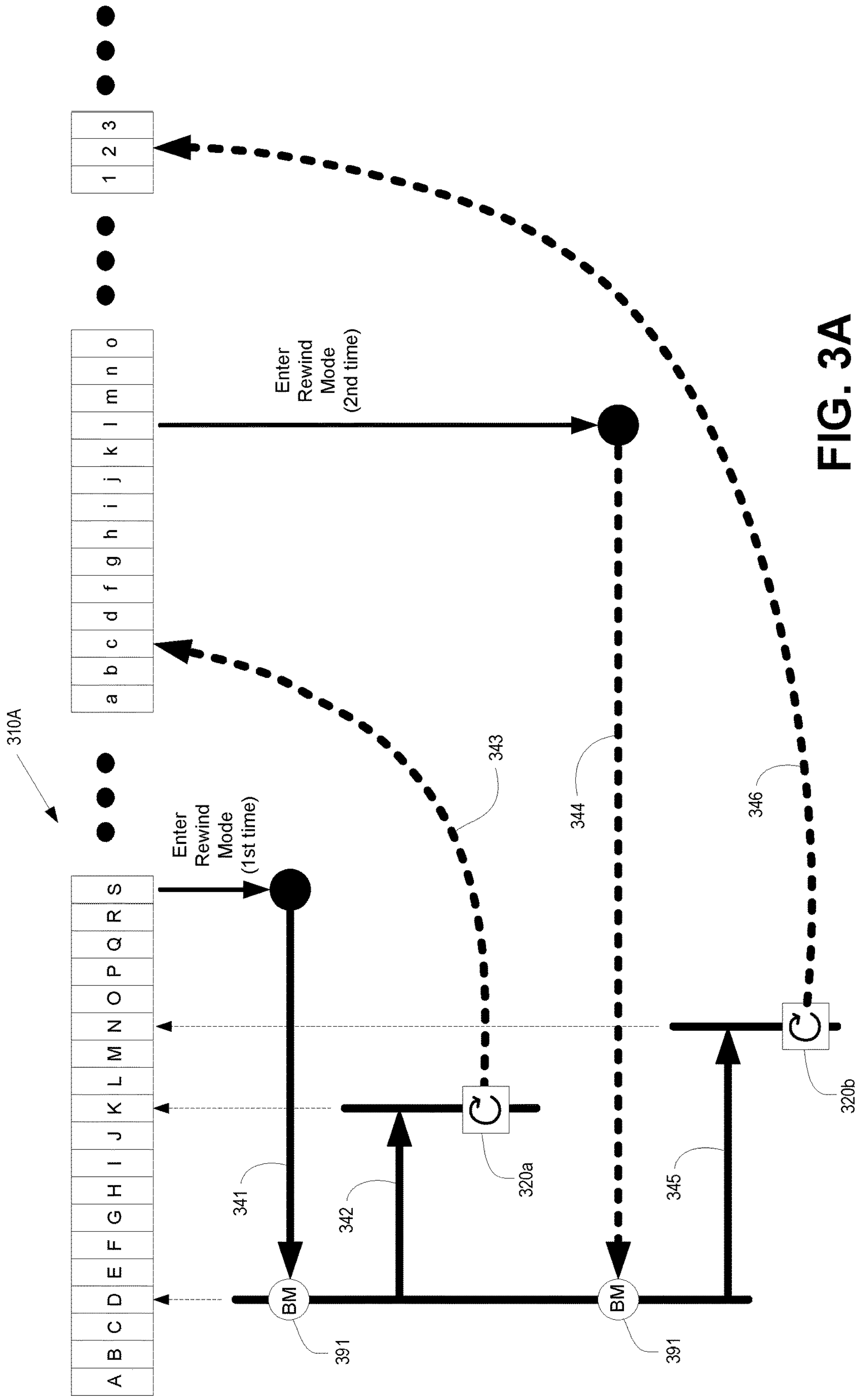
FIG. 3A is a diagram illustrating implementation of a rewind mode service during live game play of a video game by a user and including automatic bookmarking of a captured image frame associated with a portion of the game play of interest to the user for quick access by the user in a subsequent use of the rewind mode service, in accordance with one embodiment of the present disclosure.
Figure 3B:
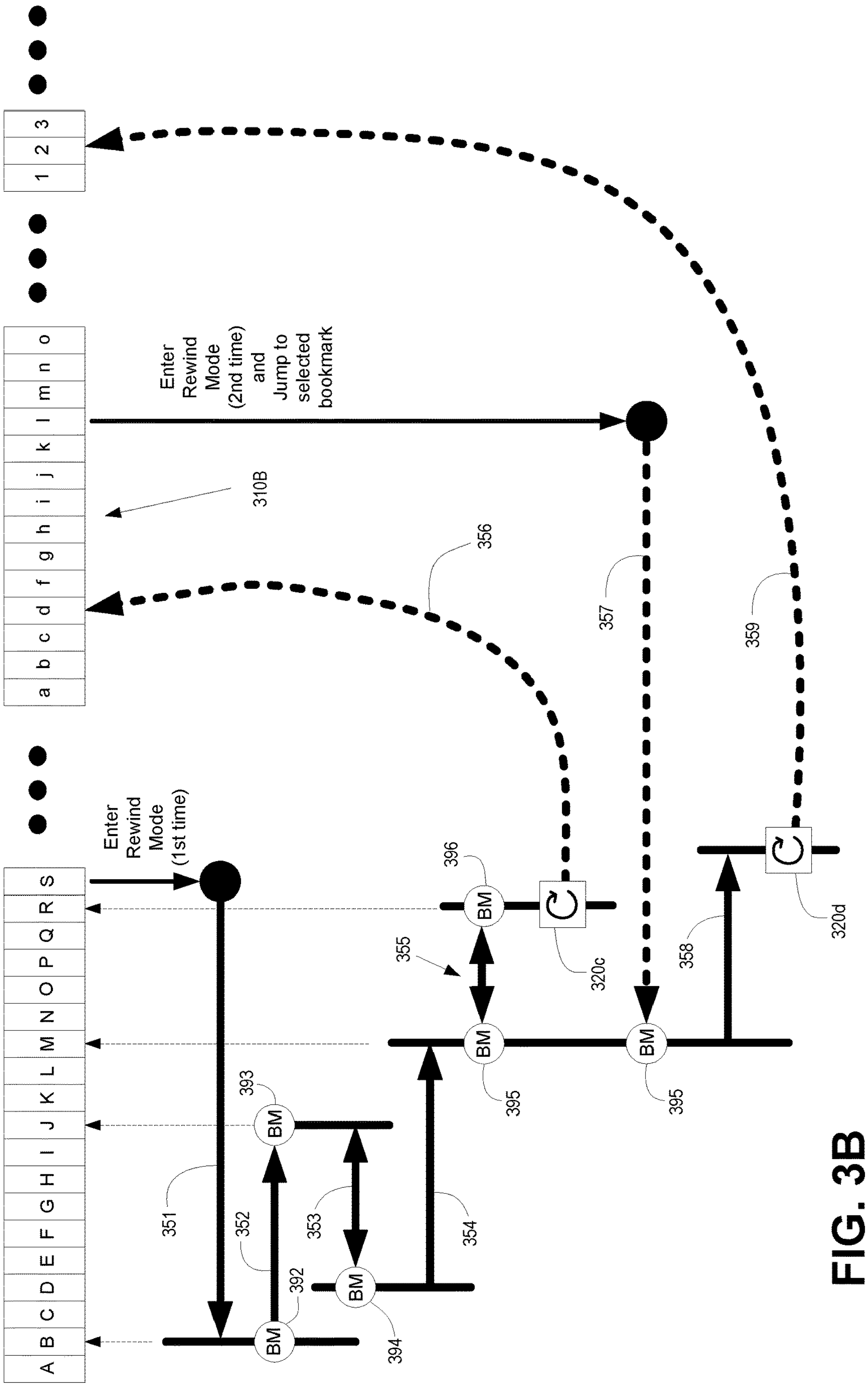
FIG. 3B is a diagram illustrating implementation of a rewind mode service during live game play of a video game by a user and including user triggered bookmarking of one or more captured image frames associated with one or more portions of the game play that are of interest to the user for selected access by the user in a subsequent use of the rewind mode service, in accordance with one embodiment of the present disclosure.
Figure 3C:
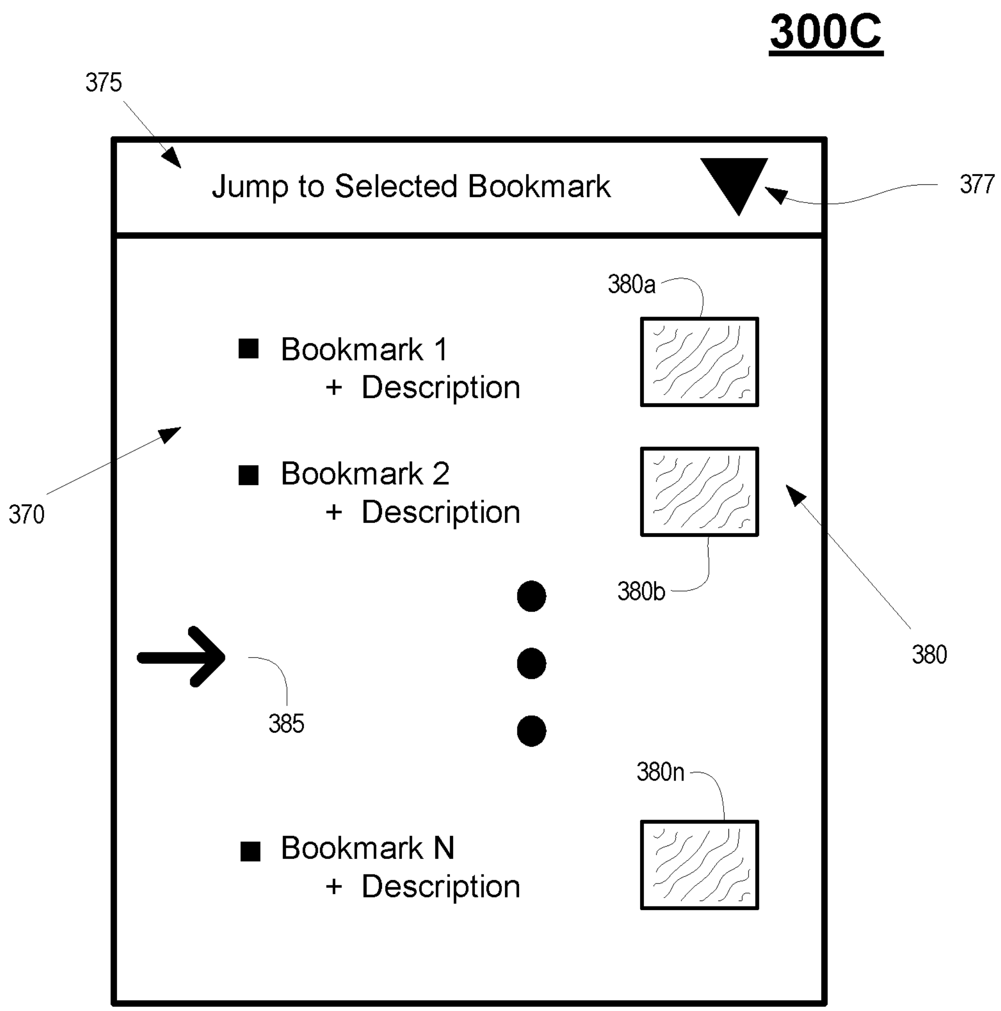
FIG. 3C illustrates a rewind mode service menu configured to list one or more bookmarks that are automatically generated for one or more captured image frames in recent game play of a video game by a user, in accordance with one embodiment of the present disclosure.

In embodiments, auto-bookmarking of captured image frames that are user triggered and/or events that are identified through analysis of telemetry data associated with the image frames generated for the live game play are described in relation to FIGS. 3A-3C.

FIG. 3A is a diagram illustrating implementation of a rewind mode service during live game play of a video game by a user, and illustrates the automatic bookmarking of a captured image frame associated with a portion of the game play of interest to the user for quick access by the user in a subsequent use of the rewind mode service, in accordance with one embodiment of the present disclosure.

A plurality of image frames 310A of live game play of the user playing a video game is shown. Each of the image frames are generated for display to the user on a corresponding device. For example, the plurality of image frames include image frames "A", "B", . . . "Q", "R", "S" . . . "a", "b", "c", . . . "l", "m", "n", "o" . . . "1", "2", "3" . . . etc. For purposes of illustration, a relevant portion of the live game play may begin with image frame "A". During live game play, the image frames may be displayed to the user in sequence, with the next image fames being shown in order as "B", "C" . . . "P", "Q", "R", "S". For case of description, each of the plurality of image frames 310A is also placed into storage as a corresponding captured image frame, but it is understood selected image frames that are generated may be stored as captured image frames (e.g. all generated image frames or selected image frames, etc.).

For a current image frame "S" being displayed, the user wishes to enter the rewind mode for the first time in a predefined period. Going backwards from the current image frame "S", the predefined period ends with the captured image frame "A", such as from a beginning of a gaming session; or going backwards from the current image frame for a predefined period (e.g. last 30 minutes, last 60 minutes, etc.). The rewind mode acts in a certain manner because it is determined that the user enters the rewind mode for the first time. For example, it may be assumed that the user desires to review recent game play, but has not actively identified the portion of the recent game play for review. For example, the user knows that a quest was introduced in the recent game play, but may not know exactly how far back to go. As such and as previously described, captured image frames of the user's game play that are in storage (e.g. ring buffer) are accessed in the rewind mode. Captured image frames of the recent game play are played in reverse beginning from the current image frame "S" (e.g. "S" then "R", then "Q", etc.) along path 341. That is, displayed image frames switches from the live game play to captured image frames for the recent game play. The captured image frames may be displayed at any predefined speed (e.g. 1×, 2×, etc.) along path 341, and may be further controlled by the user (e.g. to increase or decrease speed of displaying in reverse).

The user induces a pause or stop of the captured image frames being shown in reverse at captured image frame "D". Bookmark 391 is automatically generated based on the user triggered pause or stop at captured image frame "D". Any of several techniques may be used to identify captured image frame "D" in order to find an actual start point of the portion of the recent game play of interest to the user. The start point (e.g. captured image frame "D") may be defined as the point where the user first pauses display of captured image frames in reverse, or where the user pauses for a threshold amount of time, or when the user starts viewing a threshold number of captured image frames at normal speed with a pause or stop at the end of viewing, or as a natural start point, or an assigned start point based on user viewing (e.g. the user may be going back and forth between captured image frames that are close together in sequence and may naturally rest or pause on a start frame as captured image frame "D", or may be defined through analysis or statistical analysis, etc.). As such, bookmark 391 is automatically generated for a captured image frame (e.g., image frame "D") associated with an event of interest to the user (e.g. the portion of the recent game play starting with image frame "D") occurring when displaying captured image frames from the subset of captured image frames accessed in the rewind mode.

In particular, the user may be interested in what was occurring in the recent game play in and around the captured image frame "D". As such, the user may view the captured image frames going forward beginning from captured image frame "D" along path 342 at a predefined speed (e.g. 1×, 2×, etc.). In addition, the user may provide additional control as to the speed (e.g. increasing or decreasing, etc.). The auto-bookmarking of captured image frame "D" may be used to begin a subsequent or return to replay of that portion in a subsequent use of the rewind mode, as will be described below.

In still another embodiment, a bookmark is automatically generated for a captured image frame that is determined to be associated with an event of interest to the user based on analysis of telemetry data of the image frames. That is, once an event of interest is identified, a representative captured image frame for the event (e.g. the start captured image frame, etc.) may be determined, and a bookmark may be generated for that representative captured image frame.

After the user is done reviewing the recent game play in the rewind mode, the user may return to live game play with first actuation of return button at 320*a* at captured image frame "K", as shown on dotted path 343. A bookmark may be automatically created for captured image frame "K" showing the end of the event of interest to the user. If during use of the rewind mode, the live game play is continuing from image frame "S", then path 343 returns to image frame "c". The live game play then continues from image frame "c" and is displayed to user. On the other hand, if the live game play is paused, then after exiting the rewind mode, the live game play then continues from image frame "S".

The user may enter the rewind mode a second time at image frame "1", such as with a subsequent actuation of the universal button on the controller during the live game play that is received by the rewind mode service. From a user interface (e.g. menu) presented with the actuation of the universal button, the user may select the rewind mode. That is, the rewind mode service receives a subsequent selection of the rewind mode from the plurality of features presented in a user interface that is displayed simultaneous with the live game play. As such, the rewind mode is entered by automatically switching from displaying the live game play of the video game to displaying the captured image frame associated with the previously generated bookmark (e.g. image frame "D", etc.). That is, instead of playing captured image frames in reverse beginning from captured image frame "1", because this is a subsequent entry into the rewind mode, the first captured image frame being displayed in rewind mode is captured image frame "D" associated with bookmark 391, such that intervening captured image frames between image frames "1" and "D" are skipped, as shown along dotted path 344. In other implementations, the event of interest to the user may be associated with captured image frame "K" when the user returned to live game play.

In one embodiment, the first captured image frame is statically shown, and the user is able to control viewing image frames in forward or in reverse at a user selected speed. For example, if the first image shown is image frame "D", then the user may view the captured image frames in forward at a user selected speed, such as along path 345. On the other hand, if the first captured image shown is image frame "K", then the user may view the image frames in reverse at a user selected speed.

In another embodiment, the captured image frames are automatically displayed in forward or in reverse beginning with the first image frame. For example, if the first frame is captured image frame "D" in relation to a corresponding event, captured image frames are shown in forward at a predefined speed (e.g. 1×, 2×, etc.), with further control of the display of captured image frames by the user (e.g. forward speed, in reverse, reverse speed, pausing, etc.). For example, captured image frames may be displayed in forward in sequential order at normal speed. On the other hand, if the first image frame is captured image frame "K" in relation to a corresponding event, image frames are shown in reverse at a predefined speed (e.g. 1×, 2×, etc.).

After the user is done reviewing the recent game play in the rewind mode, the user may return to live game play with a second actuation of the return button at 320*b* at captured image frame "N", as shown on dotted path 346. A bookmark may be automatically created for captured image frame "N" showing another end of the event of interest to the user, which may be different than captured image frame "K" as the user may have found additional material of interest. If during the rewind mode the live game play is continuing, then path 346 returns to image frame "2", wherein the live game play is displayed to the user (e.g. image frames "2", "3" etc.). On the other hand, if the live game play is paused, then after exiting the rewind mode, the live game play then continues from image frame "1".

The auto-bookmarking feature in the rewind mode allows the user to flip back and forth between live game play and the recent game play that is tagged with the auto-bookmarking. For example, a bookmark may be automatically generated at the corresponding captured image frame when the user returned to live game play. In any subsequent return to the rewind mode, the captured image frame being displayed is the last image frame being bookmarked (i.e., when returning to live game play). In another implementation, in the subsequent return to the rewind mode, the captured image frame being displayed is the first bookmarked frame (i.e., image frame "D") that defines the start of the event of interest, as previously described. In another embodiment, the rewind mode is automatically entered when the universal button is actuated within a short period of time (e.g. 5 seconds, 10 seconds, 1 minute, etc.).

FIG. 3B is a diagram illustrating implementation of a rewind mode service during live game play of a video game by a user, and includes user triggered bookmarking of one or more captured image frames associated with one or more portions of the game play that are of interest to the user for selected access by the user in a subsequent use of the rewind mode service, in accordance with one embodiment of the present disclosure. As shown, a plurality of image frames 310B a live game play of the user playing a video game is generated for display to a user on a corresponding device. For ease of description, each of the plurality of image frames 310B is also placed into storage as a corresponding captured image frame, but it is understood selected image frames that are generated may be stored as captured image frames (e.g. all generated image frames or selected image frames, etc.).

The user may enter a rewind mode (e.g. actuate a universal button) and view one or more portions of recent game play. For example, for a current image frame "S", the user wishes to enter the rewind mode. A plurality of bookmarks is generated for a plurality of captured image frames associated with a plurality of events of interest to the user occurring when displaying captured image frames from the subset of captured image frames shown in the rewind mode. In one embodiment, thumbnails are also captured of corresponding captured image frames for each bookmark. If the rewind mode is entered for a first time within a predefined period as previously described, then captured image frames are displayed in reverse at a predefined speed (e.g. 1×, 2×, etc.) beginning from the current frame "S", as is shown along path 351.

At this point, the generation of multiple user triggered bookmarks is being illustrated, whether the rewind mode is entered for a first or subsequent time. A bookmark may be generated every time the user provides an input with the gaming controller (e.g. pause on a captured image frame and go forward at 1× or another predefined speed, go back and forth between a series of captured image frames, return to live game play from a captured image frame being displayed in rewind mode, etc. For example, one or more bookmarks may be automatically generated as the user is flipping back and forth between captured image frames of one or more events of interest to the user. For instance, bookmark 392 is generated at captured image frame "B" where the user paused, and then began playing captured image frames in forward along path 352. At captured image frame "J" another bookmark 393 is generated when the user paused, and then began playing captured image frames in reverse along path 353. At captured image frame "D", another bookmark 394 is generated when the user paused, and then began playing captured image frames in forward along path 354. Bookmarks 392-394 may be associated with one event of interest to the user.

Also, at captured image frame "M" a bookmark 395 is generated, and at captured image frame "R" another bookmark 396 is generated. The user may repeatedly view captured image frames between the bookmarks 395 and 396 along path 355. As such, bookmarks (e.g. 395 and 396) are automatically generated for captured image frames bracketing a series of captured image frames that are reviewed in forward or in reverse multiple times. Bookmarks 395 and 396 may be associated with a separate event of interest to the user.

After the user is done reviewing one or more portions of the recent game play in the rewind mode, the user may return to live game play with a first actuation of return button at 320*c* at image frame "R", as shown on dotted path 356. If during use of the rewind mode, the live game play is continuing from image frame "S", then path 356 returns to image frame "d", wherein the live game play is then displayed from that frame. On the other hand, if the live game play is paused, then after exiting the rewind mode, the live game play then continues from image frame "S".

The user may enter the rewind mode a second time at frame "1", such as with a subsequent actuation of the universal button on the controller during the live game play that is received by the rewind mode service. From a user interface (e.g. menu) presented with the actuation of the universal button, the user may select the rewind mode. The rewind mode server receives a subsequent selection of the rewind mode from the plurality of features presented in the user interface displayed simultaneous with the live game play.

The previously generated plurality of bookmarks is shown in the user interface for selection by the user. Also, at least one of the bookmarks is presented with a corresponding thumbnail of a corresponding captured image frame. For example, FIG. 3C illustrates a rewind mode service menu 300C configured to list one or more bookmarks that are automatically generated for captured image frames in recent game play of a video game by a user, in accordance with one embodiment of the present disclosure. As shown, the use interface may include a selectable feature 375 that allows the user to jump to a selected bookmark. Drop down icon 377 when actuated may list one or more bookmarks 370. For example, bookmarks 1 through N are shown in the menu 300C (e.g. shown in the user interface). Each of the bookmarks may also be shown with an accompanying description and a corresponding thumbnail. For example, bookmark 1 may have a corresponding thumbnail 380*a*, bookmark 2 may have a corresponding thumbnail 380*b* . . . and bookmark N may have a corresponding thumbnail 380*n*. The one or more bookmarks 370 may be aligned with the bookmarks 392 through 396 shown in FIG. 3B. For example, bookmark 1 may correspond to bookmark 392 and thumbnail 380*a* may correspond to captured image frame "B", and bookmark 2 may correspond to bookmark 393 and thumbnail 380*b* may correspond to captured image frame "J", and bookmark N may correspond to bookmark 396 and thumbnail 380*n* may correspond to captured image frame "R".

Returning back to FIG. 3B, the rewind mode service may receive selection of a bookmark, such as bookmark 395 that is displayed in the menu and/or interface listing one or more bookmarks. As such, the rewind mode is entered by automatically switching from displaying the live game play of the video game to displaying the image frame "M" associated with the selected bookmark 395. That is, in the subsequent entry to the rewind mode, the first captured image frame being displayed is image frame "M", such that intervening image frames placed in storage between captured image frames "1" and "M" are skipped, as shown along dotted path 357. In one embodiment, the first captured image frame is statically shown, and the user is able to control viewing captured image frames in forward or in reverse at a user selected speed. In another embodiment, the captured image frames are automatically displayed in forward or in reverse beginning with the first captured image frame at a predefined speed (e.g. 1×, 2×, etc.), with further control of the display of captured image frames by the user (e.g. forward speed, in reverse, reverse speed, pausing, etc.). For example, captured image frames may be displayed in forward in sequential order at normal speed along path 358.

After the user is done reviewing the recent game play in the rewind mode, the user may return to live game play with a second actuation of the return button at 320*d* at a corresponding captured image frame (not shown) along dotted path 359. A bookmark may be automatically created at that captured image frame. If during the rewind mode the live game play is continuing, then path 359 returns to image frame "2", wherein the live game play is displayed to the user (e.g. image frames "2", "3" etc.). On the other hand, if the live game play is paused, then after exiting the rewind mode, the live game play then continues from image frame "1".

Figure 4A:
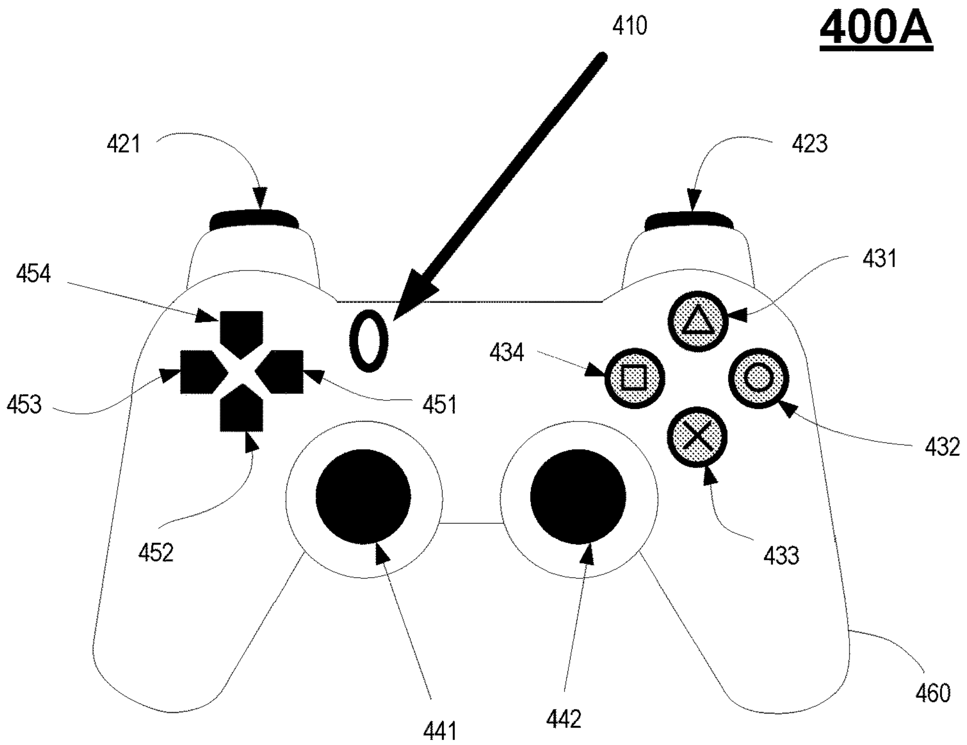
FIG. 4A illustrates a game controller used to access a rewind mode service during live game play enabling replay of captured image frames of recent game play, in accordance with one embodiment of the present disclosure.

FIG. 4A illustrates a game controller 400A used to access a rewind mode service during live game play enabling replay of captured image frames of recent game, in accordance with one embodiment of the present disclosure. The game controller 400A may be used to control game play of a video game by a user. In addition, the game controller 400A may be used to enter a rewind mode, and control the display of captured image frames when in the rewind mode. Other embodiments support voice activated or other means for controlling access to and control of the rewind mode.

In particular, game controller 400A may include one or more interaction buttons that may be associated with one or more control instructions. The interaction buttons may include a left stick 441 and right stick 442. The interaction buttons may include a left shoulder button 421 and right shoulder button 423. A left trigger button (not shown) may be located below left shoulder button 421, and right trigger button (not shown) may be located below right shoulder button 423. In addition, the interaction buttons may include a group of direction instruction buttons including forward or up direction button 454, reverse or down direction button 452, left direction button 453, and right direction button 451. The interaction buttons may include another group of gaming buttons to include tringle button 431, circle button 432, cross button 433 and square button 434.

Game controller 400A includes a universal button 410 configured to provide access to one or more features, including the rewind mode. The universal button 410 may be classified as a system button that generally is not being used to control the game being played. For example, the universal button 410 when actuated displays a list of features for the user, such as the rewind mode, a sharing mode for generating a file including a portion of game play that the user would like to share with others, a highlight reel mode that is used to generate a highlight reel of game play, etc.

Once in the rewind mode, one or more interaction buttons on the controller 400A may be used to control viewing of image frames from the buffer. For example, a first button may be configured to rewind or fast rewind; second button to pause or stop; third button to go forward or fast forward; fourth button to play from that point of the recorded game play being shown; and a fourth button to return back to live game play. For example, when in the rewind mode, left trigger may be used to display captured image frames in reverse with a first actuation playing captured image frames at 1× speed in reverse, and subsequent interactions at increasing speeds in reverse (e.g. 2×, 10×, etc.). Also, the right trigger may be used to display captured image frames in forward with a first actuation playing captured image frames at 1× speed, and subsequent interactions at increasing speeds in forward (e.g. 2×, 10×, etc.). The square button 434 may be used to pause on a captured image frame and/or play captured image frames beginning from a paused captured image frame. The triangle button 431 may be used to play captured image frames at any point in the rewind mode. The cross button 433 may be used to return to live game play.

Figure 4B:
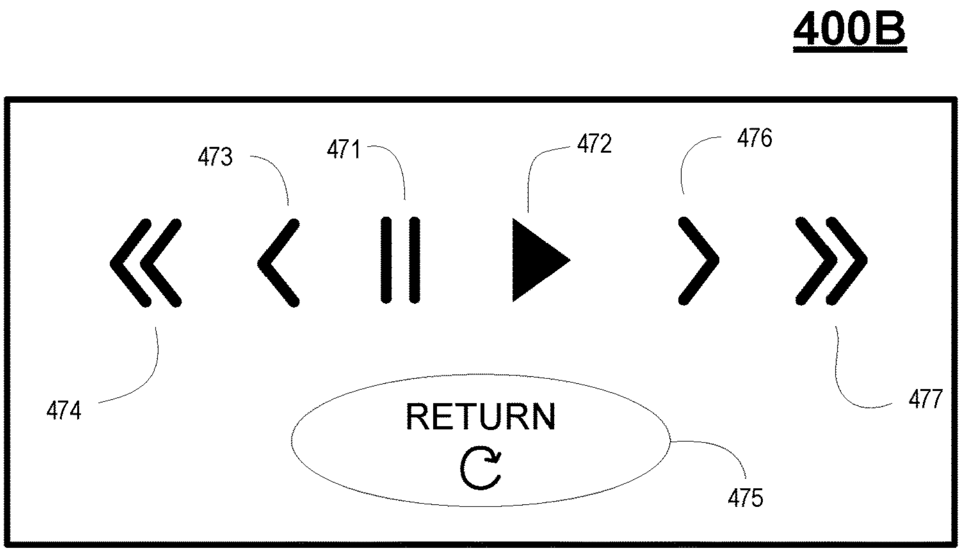
FIG. 4B illustrates a user interface used to control replaying of captured image frames of recent game play implemented through a rewind mode service implemented during live game play of a video game, in accordance with one embodiment of the present disclosure.

FIG. 4B illustrates a user interface or menu 400B used to control replaying of captured image frames of recent game play stored in a buffer implemented through a rewind mode service implemented during live game play of a video game, in accordance with one embodiment of the present disclosure. Instead of using buttons on a controller, other user interactions with the user interface 400B (e.g. hand gestures used to control selection of icons in the user interface 400B, voice activation, etc.) may be used to control the display of captured image frames while in reverse mode. The user interface 400B may be overlaid the captured image frames shown in the display while in reverse mode.

For example, icon 472 when actuated instructs the rewind mode to display captured image frames in forward at normal speed at any point in the rewind mode. Also, icon 471 when actuated instructs the rewind mode to pause on a selected captured image frame at any point in the rewind mode. Icon 473 when actuated instructs the rewind mode to display captured image frames in reverse at a preselected speed (e.g. 1×, 2×, etc.) at any point in the rewind mode. Icon 474 when actuated instructs the rewind mode to display captured image frames in reverse at an increased speed from the current speed (e.g. increasing to 10×). Also, icon 476 when actuated instructs the rewind mode to display captured image frames in forward at a preselected speed (e.g. 1×, 2×, etc.) at any point in the rewind mode. Icon 477 when actuated instructs the rewind mode to display captured image frames in forward at an increased speed from the current speed (e.g. increasing to 10×).

In addition, icon 475 when actuated instructs the rewind mode to terminate and return back to displaying live game play. For example, when the live game play is continuing during use of rewind mode, the live game play returns to an updated current image. On the other hand, when the live game play is paused during the rewind mode, the live game play returns to the current image from which the rewind mode was first enabled.

In still another embodiment, hand gestures or other means may be used to control display of captured image frames in reverse mode as represented by the icons in the user interface. For example, swiping right with a hand or finger may indicate that the user would like to play forward at normal speed or fast forward through the captured image frames, with subsequent swipes to the right indicating an increase in the fast forward. Conversely swiping to the left indicates control of reverse mode display of captured image frames. An upward hand or finger position may indicate a pause or play. And a circle motion may indicate a return to live game play.

As previously introduced, captured image frames may be temporarily placed into storage. In one embodiment, the storage is a ring buffer of a fixed size. In general, the ring buffer is configured to overwrite old data with new data, especially when the ring buffer is full (e.g. continually cats its tail as new data is stored). Without going into specifics and for purposes of illustration only, the ring buffer may implement one or more complex methods when storing image frames. For example, captured image frames may not be of constant sizing, so adding a new element (e.g. new captured image frame) may require the removal of multiple older elements (e.g. older captured image frames), such as when the ring buffer is full; or the new element may be added to the ring buffer without removing an old element, such as when the ring buffer still has space. In still another example, the ring buffer may have a granularity of operation, such that single elements cannot be removed; and instead a plurality of elements are removed together.

Figure 5:
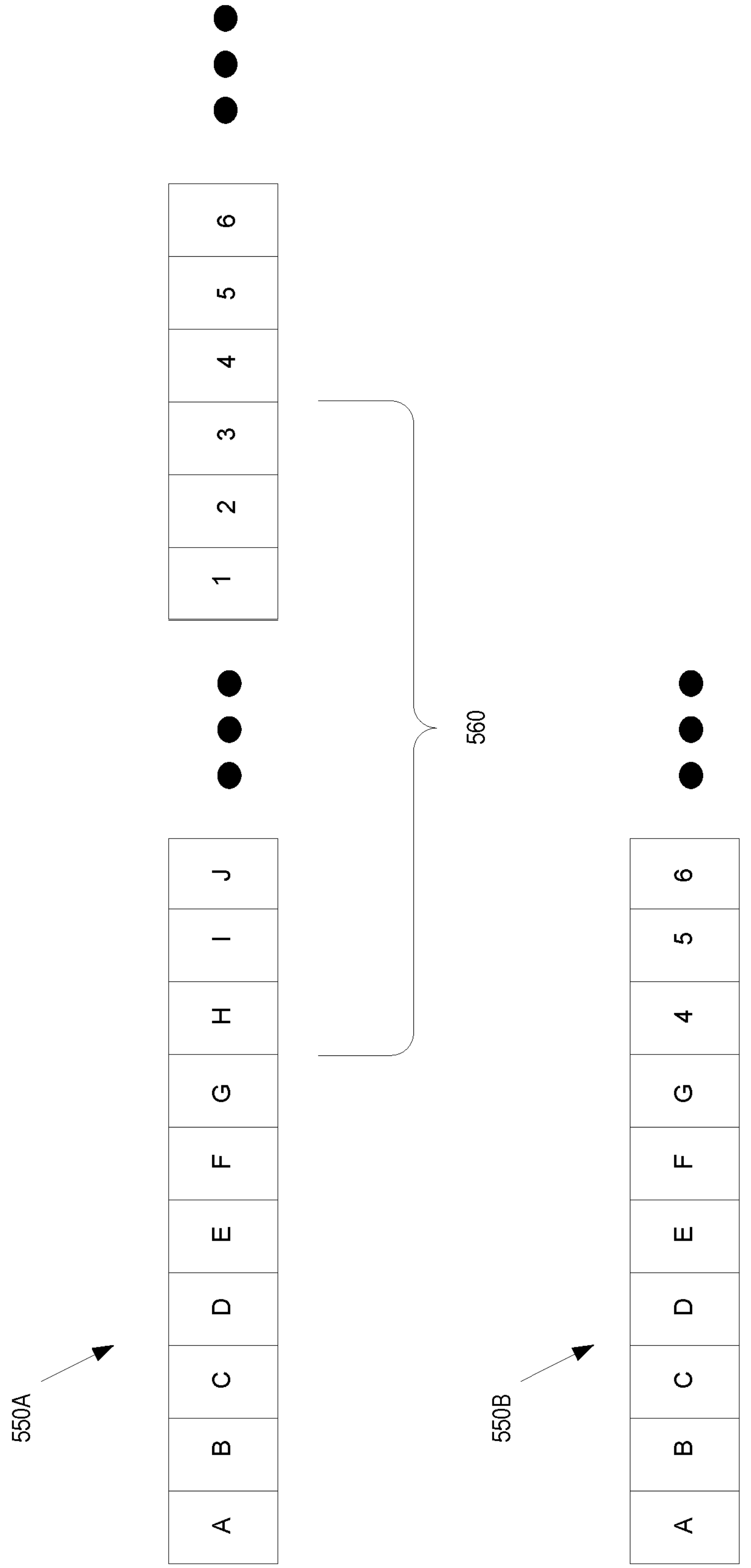
FIG. 5 illustrates the telescoping of captured image frames of live game play of a video game by a user to reduce the number of stored image frames of the live game play that are accessible via a rewind mode service enabling replay of the stored image frames, in accordance with one embodiment of the present disclosure.

FIG. 5 illustrates the telescoping of image frames of live game play of a video game by a user to reduce the number of captured image frames of the live game play that are accessible (e.g. from storage) via a rewind mode service enabling replay of the captured image frames, in accordance with one embodiment of the present disclosure. As shown, a plurality of image frames 550A is being generated for live game play of a video game by a user. For example, the image frames 550A may include image frames "A", "B", "C" . . . "H", "I", "J" . . . "1", "2", "3", "4", "5", "6", etc. Typically, one or more of these image frames may be placed directly into storage (e.g. a buffer or ring buffer, etc.) as captured image frames, as previously described, with or without encoding.

With telescoping, analysis is performed on the plurality of image frames 550A to determine image frames that have little to no importance, such as through a filter. The analysis may be based on telemetry data associated with the image frames, or may be based on the image frames themselves (e.g. artificial intelligence used to identify features in the image frames, etc.). For example, when the user steps away from a game play session, a character may enter into a static or near catatonic state just waiting for the next controller input (e.g. standing in one place and breathing). For illustration purposes only, a group of image frames 560 is identified as having little to no importance. The group of image frames includes frames "H", "I", "J" . . . "1", "2", and "3".

These image frames identified as having little to no value can be removed from storing to the buffer, or if already stored as captured image frames, then removed from the buffer. In either case, after removal of the group of image frames 560, a reduced plurality of image frames 550B is then placed into storage as captured image frames. This may be important when wanting to increase the amount of game play that is accessible from storage that is of fixed size. That is, by removing one or more image frames, more of the game play (e.g. relevant image frames) occurring over an increased span of time may be stored as captured image frames. For example, while a buffer or ring buffer as storage may typically store up to 120 minutes of recent game play, when filtering of image frames is performed the buffer may effectively store up to 200 minutes or more of the recent game play by including captured image frames that are determined to have importance, and excluding image frames that are not relevant or unimportant.

In still another embodiment, telemetry data is collected from the image frames being generated during game play of a video game by a user. The telemetry data may be analyzed to determine events of importance or significance to the user (e.g. when a quest is first introduced, beating a boss, start at a first stage or any stage, fought the ultimate boss, when a character died, acquiring a legendary weapon, facts provided by an NPC, etc.). The analysis may be performed through artificial intelligence techniques, such as building an AI model to parse out features in the game play and to identify events of importance in the game play. Identified events in the game play may be associated with one or more captured image frames when utilizing the rewind mode, and provide for acceleration and deceleration of display of captured image frames when in rewind mode. For example, when displaying captured image frames of recent game play in forward or reverse, the speed of the captured image frames may be increased and decreased over time automatically. In particular, when first displaying the captured image frames in forward or reverse the speed may be gradually increased or accelerated as long as the user does not interrupt the display with a control instruction, as the user is happy to use the automatic display of captured image frames at various speeds. In that manner, the user is able to view recent game play quickly. In addition, when an event of importance that has been tagged and/or identified is approaching, the display of the captured image frames may be decelerated to a speed (e.g. 1×, 2×, etc.) that the user is able to review and visually process captured image frames during that event. Once the captured image frames for that event have been passed, then the display of captured image frames are gradually accelerated again until the next event, at which point the display of captured image frames is decelerated to an appropriate speed.

In another embodiment, frame interpolation is performed when fast-forwarding or fast reversing of captured image frames of recent game play stored in a buffer. Typically, during compression intra-coded (I-frames) image frames are generated that are complete images, and predicted (P-frames) image frames are also generated that are built based on a previous I-frame and one or more intervening P-frames. B-frames can use frames on either side of the image frame for building the corresponding image frame. When fast-forwarding or fast-reversing the display of captured image frames, typically only I-frames are decoded and displayed. This may present choppy sequences of image frames for viewing as only I-frames are displayed. Rather than decode all the intervening I-frames and P-frames to select one or more additional captured frames for display in order to smooth out the fast-forwarding or fast-reversing of image frames, frame interpolation can be performed. That is, one or more interpolated frames between any two I-frames, that are displayed in fast-forward or in fast-reverse, may be generated based on the I-frames. The one or more interpolated frames may also be displayed between corresponding I-frames during the fast-forwarding or fast-reversing of image frames to smooth out the choppiness introduced when gaps between I-frames that are displayed are large.

Figure 6:
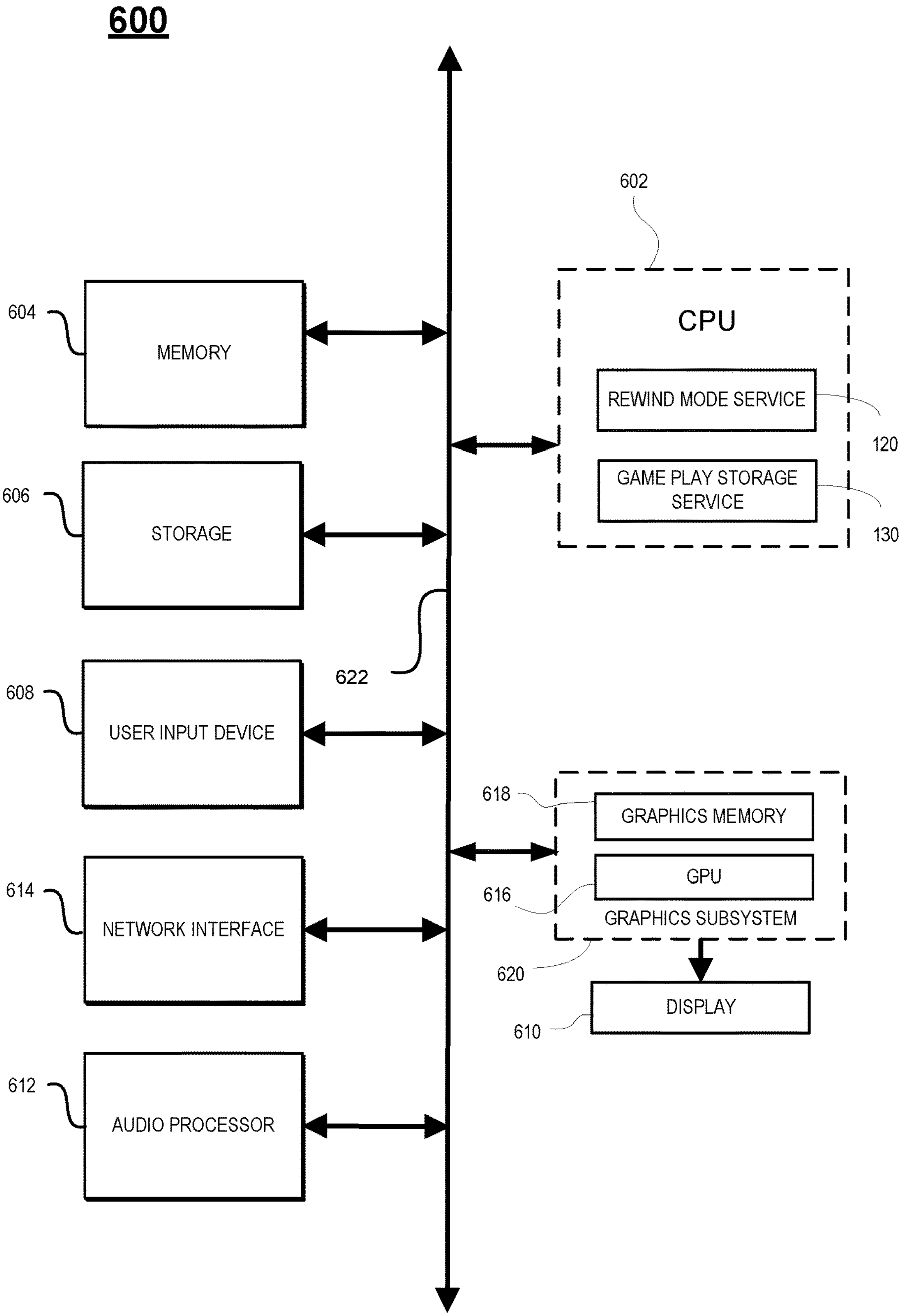
FIG. 6 illustrates components of an example device that can be used to perform aspects of the various embodiments of the present disclosure.

FIG. 6 illustrates components of an example device 600 that can be used to perform aspects of the various embodiments of the present disclosure. This block diagram illustrates a device 600 that can incorporate or can be a personal computer, video game console, personal digital assistant, a server or other digital device, suitable for practicing an embodiment of the disclosure. Device 600 includes a central processing unit (CPU) 602 for running software applications and optionally an operating system. CPU 602 may be comprised of one or more homogeneous or heterogeneous processing cores. For example, CPU 602 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 600 may be a localized to a user/player playing a game segment (e.g. game console), or remote from the player (e.g. back-end server processor), or one of many servers using virtualization in a game cloud system for remote streaming of gameplay to clients, or for implementing additional services such as a supervisor functionality.

In particular, CPU 602 may be configured to implement a rewind mode service 120 configured to enable replaying of recent game play through a system implemented rewind mode of live game play. The rewind mode is accessible via a universal button to enable replaying of captured image frames of the game play placed in storage. In that manner, the user is able to enter the rewind mode from the live game play using one or more controller inputs to view recent game play (e.g. rewinding, fast-forwarding, playing, etc.), and return to live game play afterwards. Also, CPU 602 may be configured to implement a temporary game play storage service 130 that is configured to temporarily store captured image frames from recent game play of a video game by a user/player. For example, captured image frames from the recent game play may be stored in a buffer (e.g. ring buffer of fixed size) without creating a file, wherein one or more captured image frames from the recent game play may be accessed via the rewind mode service 120 to enable replaying of recent game play.

Memory 604 stores applications and data for use by the CPU 602. Storage 606 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 608 communicate user inputs from one or more users to device 600, examples of which may include keyboards, mice, joysticks, touch pads, touch screens, still or video recorders/cameras, tracking devices for recognizing gestures, and/or microphones. Network interface 614 allows device 600 to communicate with other computer systems via an electronic communications network, and may include wired or wireless communication over local area networks and wide area networks such as the internet. An audio processor 612 is adapted to generate analog or digital audio output from instructions and/or data provided by the CPU 602, memory 604, and/or storage 606. The components of device 600, including CPU 602, memory 604, data storage 606, user input devices 608, network interface 610, and audio processor 612 are connected via one or more data buses 622.

A graphics subsystem 620 is further connected with data bus 622 and the components of the device 600. The graphics subsystem 620 includes a graphics processing unit (GPU) 616 and graphics memory 618. Graphics memory 618 includes a display memory (e.g. a frame buffer) used for storing pixel data for each pixel of an output image. Graphics memory 618 can be integrated in the same device as GPU 616, connected as a separate device with GPU 616, and/or implemented within memory 604. Pixel data can be provided to graphics memory 618 directly from the CPU 602. Alternatively, CPU 602 provides the GPU 616 with data and/or instructions defining the desired output images, from which the GPU 616 generates the pixel data of one or more output images. The data and/or instructions defining the desired output images can be stored in memory 604 and/or graphics memory 618. In an embodiment, the GPU 616 includes 3D rendering capabilities for generating pixel data for output images from instructions and data defining the geometry, lighting, shading, texturing, motion, and/or camera parameters for a scene. The GPU 616 can further include one or more programmable execution units capable of executing shader programs. In one embodiment, GPU 616 may be implemented within an AI engine (e.g. machine learning engine 190) to provide additional processing power, such as for the AI, machine learning functionality, or deep learning functionality, etc.

The graphics subsystem 620 periodically outputs pixel data for an image from graphics memory 618 to be displayed on display device 610. Display device 610 can be any device capable of displaying visual information in response to a signal from the device 600, including CRT, LCD, plasma, and OLED displays. Device 600 can provide the display device 610 with an analog or digital signal, for example.

In other embodiments, the graphics subsystem 620 includes multiple GPU devices, which are combined to perform graphics processing for a single application that is executing on a corresponding CPU. For example, the multiple GPUs can perform alternate forms of frame rendering, wherein GPU 1 renders a first frame, and GPU 2 renders a second frame, in sequential frame periods, and so on until reaching the last GPU whereupon the initial GPU renders the next video frame (e.g. if there are only two GPUs, then GPU 1 renders the third frame). That is the GPUs rotate when rendering frames. The rendering operations can overlap, wherein GPU 2 may begin rendering the second frame before GPU 1 finishes rendering the first frame. In another implementation, the multiple GPU devices can be assigned different shader operations in the rendering and/or graphics pipeline. A master GPU is performing main rendering and compositing. For example, in a group including three GPUs, master GPU 1 could perform the main rendering (e.g. a first shader operation) and compositing of outputs from slave GPU 2 and slave GPU 3, wherein slave GPU 2 could perform a second shader (e.g. fluid effects, such as a river) operation, the slave GPU 3 could perform a third shader (e.g. particle smoke) operation, wherein master GPU 1 composites the results from each of GPU 1, GPU 2, and GPU 3. In that manner, different GPUs can be assigned to perform different shader operations (e.g. flag waving, wind, smoke generation, fire, etc.) to render a video frame. In still another embodiment, each of the three GPUs could be assigned to different objects and/or parts of a scene corresponding to a video frame. In the above embodiments and implementations, these operations could be performed in the same frame period (simultaneously in parallel), or in different frame periods (sequentially in parallel).

Accordingly, in various embodiments the present disclosure describes systems and methods configured for enabling a rewind mode of live game play that is accessible via a universal button on a game controller during live game play, wherein the rewind mode is configured for accessing a user interface enabling rewinding and forwarding through captured image frames of the game play.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g. matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet. It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g. prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g. accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g. accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g. feedback data) from the client device or directly from the cloud gaming server.

Access to the cloud gaming network by the client device may be achieved through a communication network implementing one or more communication technologies. In some embodiments, the network may include 5th Generation (5G) network technology having advanced wireless communication systems. 5G is the fifth generation of cellular network technology. 5G networks are digital cellular networks, in which the service area covered by providers is divided into small geographical areas called cells. Analog signals representing sounds and images are digitized in the telephone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a pool of frequencies that are reused in other cells. The local antennas are connected with the telephone network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

In one embodiment, the various technical examples can be implemented using a virtual environment via a head-mounted display (HMD). An HMD may also be referred to as a virtual reality (VR) headset. As used herein, the term "virtual reality" (VR) generally refers to user interaction with a virtual space/environment that involves viewing the virtual space through an HMD (or VR headset) in a manner that is responsive in real-time to the movements of the HMD (as controlled by the user) to provide the sensation to the user of being in the virtual space or metaverse. For example, the user may see a three-dimensional (3D) view of the virtual space when facing in a given direction, and when the user turns to a side and thereby turns the HMD likewise, then the view to that side in the virtual space is rendered on the HMD. An HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g. game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD the real-world objects, and inertial sensor data from the, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in the prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on an HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

With the above embodiments in mind, it should be understood that embodiments of the present disclosure can employ various computer-implemented operations involving data stored in computer systems. These operations are those requiring physical manipulation of physical quantities.

Any of the operations described herein that form part of embodiments of the present disclosure are useful machine operations. Embodiments of the disclosure also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation may be produced by an emulator. In either case, if the video game is represented as a simulation, that simulation is capable of being executed to render interactive content that can be interactively streamed, executed, and/or controlled by user input.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method, comprising:

receiving actuation of a universal button on a controller during live game play of a video game being played by a user, wherein a plurality of image frames of the live game play that is generated through execution of the video game in response to game controller input by the user is presented in sequential order on a display of the user, wherein a current image frame is being displayed when the universal button is actuated;

receiving selection of a rewind mode from a plurality of features presented in a user interface displayed simultaneous with one or more corresponding image frames of the live game play in response to the actuation of the universal button;

accessing from storage a subset of captured image frames of the plurality of image frames generated for the live game play of the video game;

entering the rewind mode by automatically switching from displaying the live game play of the video game to displaying the subset of captured image frames in reverse beginning from the current image frame; and responding to one or more rewind controller inputs by the user configured for controlling the displaying of the subset of captured image frames in the rewind mode.

2. The method of claim 1, further comprising:

encoding the plurality of image frames; and automatically storing each of the captured image frames that is encoded in the storage in sequential order, wherein the storage is a ring buffer that overwrites old data with new data when the ring buffer is full.

3. The method of claim 1, wherein the one or more rewind controller inputs by the user are taken from a group including:

rewind at one or more speeds; or pause or stop; or fast forward at one or more speeds; or play.

4. The method of claim 1, wherein the one or more rewind controller inputs are implemented through at least one of:

one or more controller buttons of a game controller; or one or more controller icons displayed in a user interface that is displayed during the rewind mode.

5. The method of claim 1, further comprising:

receiving a return rewind controller input from the user; and exiting the rewind mode by displaying the live game play of the video game.

6. The method of claim 5, further comprising:

returning to the current image frame displayed when the rewind mode is exited, wherein the live game play has been paused when the rewind mode is entered; or returning to an updated current image frame when the rewind mode is exited, wherein the live game play continues when the rewind mode is entered.

7. The method of claim 5, further comprising:

automatically generating a bookmark for an image frame associated with an event of interest to the user occurring when displaying image frames from the subset of captured image frames in the rewind mode;

receiving a subsequent actuation of the universal button on the controller during the live game play;

receiving a subsequent selection of the rewind mode from the plurality of features presented in the user interface displayed simultaneous with the live game play in response to the subsequent actuation of the universal button;

entering the rewind mode by automatically switching from displaying the live game play of the video game to displaying the image frame associated with the bookmark; and displaying one or more image frames beginning from the image frame associated with the bookmark in sequential order in forward at a normal speed.

8. The method of claim 5, further comprising:

automatically generating a plurality of bookmarks for a plurality of image frames associated with a plurality of events of interest to the user occurring when displaying image frames from the subset of captured image frames in the rewind mode;

receiving a subsequent actuation of the universal button on the controller during the live game play;

receiving a subsequent selection of the rewind mode from the plurality of features presented in the user interface displayed simultaneous with the live game play in response to the subsequent actuation of the universal button;

presenting the plurality of bookmarks in the user interface for selection by the user, wherein at least one of the plurality of bookmarks is presented with a corresponding thumbnail of a corresponding image frame from the plurality of image frames associated with the plurality of events of interest to the user;

receiving a selection of a bookmark from the plurality of bookmarks; and entering the rewind mode by automatically switching from displaying the live game play of the video game to displaying the image frame associated with the bookmark; and displaying one or more image frames beginning from the image frame associated with the bookmark in sequential order in forward at a normal speed.

9. A non-transitory computer-readable medium storing a computer program for performing a method, the computer-readable medium comprising:

program instructions for receiving actuation of a universal button on a controller during live game play of a video game being played by a user, wherein a plurality of image frames of the live game play that is generated through execution of the video game in response to game controller input by the user is presented in sequential order on a display of the user, wherein a current image frame is being displayed when the universal button is actuated;

program instructions for receiving selection of a rewind mode from a plurality of features presented in a user interface displayed simultaneous with one or more corresponding image frames of the live game play in response to the actuation of the universal button;

program instructions for accessing from storage a subset of captured image frames of the plurality of image frames generated for the live game play of the video game;

program instructions for entering the rewind mode by automatically switching from displaying the live game play of the video game to displaying the subset of captured image frames in reverse beginning from the current image frame; and program instructions for responding to one or more rewind controller inputs by the user configured for controlling the displaying of the subset of captured image frames in the rewind mode.

10. The non-transitory computer-readable medium of claim 9, wherein in the method of the one or more rewind controller inputs are implemented through at least one of:

one or more controller buttons of a game controller; or one or more controller icons displayed in a user interface that is displayed during the rewind mode.

11. The non-transitory computer-readable medium of claim 9, further comprising:

program instructions for receiving a return rewind controller input from the user; and program instructions for exiting the rewind mode by displaying the live game play of a video game.

12. The non-transitory computer-readable medium of claim 11, further comprising:

program instructions for returning to the current image frame displayed when the rewind mode is exited, wherein the live game play has been paused when the rewind mode is entered; or program instructions for returning to an updated current image frame when the rewind mode is exited, wherein the live game play continues when the rewind mode is entered.

13. The non-transitory computer-readable medium of claim 11, further comprising:

program instructions for automatically generating a bookmark for an image frame associated with an event of interest to the user occurring when displaying image frames from the subset of captured image frames in the rewind mode;

program instructions for receiving a subsequent actuation of the universal button on the controller during the live game play;

program instructions for receiving a subsequent selection of the rewind mode from the plurality of features presented in the user interface displayed simultaneous with the live game play in response to the subsequent actuation of the universal button;

program instructions for entering the rewind mode by automatically switching from displaying the live game play of the video game to displaying the image frame associated with the bookmark; and displaying one or more image frames beginning from the image frame associated with the bookmark in sequential order in forward at a normal speed.

14. The non-transitory computer-readable medium of claim 11, further comprising:

automatically generating a plurality of bookmarks for a plurality of image frames associated with a plurality of events of interest to the user occurring when displaying image frames from the subset of captured image frames in the rewind mode;

receiving a subsequent actuation of the universal button on the controller during the live game play;

receiving a subsequent selection of the rewind mode from the plurality of features presented in the user interface displayed simultaneous with the live game play in response to the subsequent actuation of the universal button;

presenting the plurality of bookmarks in the user interface for selection by the user, wherein at least one of the plurality of bookmarks is presented with a corresponding thumbnail of a corresponding image frame from the plurality of image frames associated with the plurality of events of interest to the user;

receiving a selection of a bookmark from the plurality of bookmarks; and entering the rewind mode by automatically switching from displaying the live game play of the video game to displaying the image frame associated with the bookmark; and displaying one or more image frames beginning from the image frame associated with the bookmark in sequential order in forward at a normal speed.

15. A computer system comprising:

a processor;

memory coupled to the processor and having stored therein instructions that, if executed by the computer system, cause the computer system to execute a method, comprising:

receiving actuation of a universal button on a controller during live game play of a video game being played by a user, wherein a plurality of image frames of the live game play that is generated through execution of the video game in response to game controller input by the user is presented in sequential order on a display of the user, wherein a current image frame is being displayed when the universal button is actuated;

receiving selection of a rewind mode from a plurality of features presented in a user interface displayed simultaneous with one or more corresponding image frames of the live game play in response to the actuation of the universal button;

accessing from storage a subset of captured image frames of the plurality of image frames generated for the live game play of the video game;

entering the rewind mode by automatically switching from displaying the live game play of the video game to displaying the subset of captured image frames in reverse beginning from the current image frame; and responding to one or more rewind controller inputs by the user configured for controlling the displaying of the subset of captured image frames in the rewind mode.

16. The computer system of claim 15, wherein in the method of the one or more rewind controller inputs are implemented through at least one of:

one or more controller buttons of a game controller; or one or more controller icons displayed in a user interface that is displayed during the rewind mode.

17. The computer system of claim 15, the method further comprising:

receiving a return rewind controller input from the user; and exiting the rewind mode by displaying the live game play of the video game.

18. The computer system of claim 17, the method further comprising:

returning to the current image frame displayed when the rewind mode is exited, wherein the live game play has been paused when the rewind mode is entered; or returning to an updated current image frame when the rewind mode is exited, wherein the live game play continues when the rewind mode is entered.

19. The computer system of claim 17, the method further comprising:

automatically generating a bookmark for an image frame associated with an event of interest to the user occurring when displaying image frames from the subset of captured image frames in the rewind mode;

receiving a subsequent actuation of the universal button on the controller during the live game play;

receiving a subsequent selection of the rewind mode from the plurality of features presented in the user interface displayed simultaneous with the live game play in response to the subsequent actuation of the universal button;

entering the rewind mode by automatically switching from displaying the live game play of the video game to displaying the image frame associated with the bookmark; and displaying one or more image frames beginning from the image frame associated with the bookmark in sequential order in forward at a normal speed.

20. The computer system of claim 17, the method further comprising:

automatically generating a plurality of bookmarks for a plurality of image frames associated with a plurality of events of interest to the user occurring when displaying image frames from the subset of captured image frames in the rewind mode;

receiving a subsequent actuation of the universal button on the controller during the live game play;

receiving a subsequent selection of the rewind mode from the plurality of features presented in the user interface displayed simultaneous with the live game play in response to the subsequent actuation of the universal button;

presenting the plurality of bookmarks in the user interface for selection by the user, wherein at least one of the plurality of bookmarks is presented with a corresponding thumbnail of a corresponding image frame from the plurality of image frames associated with the plurality of events of interest to the user;

receiving a selection of a bookmark from the plurality of bookmarks; and entering the rewind mode by automatically switching from displaying the live game play of the video game to displaying the image frame associated with the bookmark; and displaying one or more image frames beginning from the image frame associated with the bookmark in sequential order in forward at a normal speed.

* * * * *